United States Patent
Jung

(10) Patent No.: US 9,890,824 B1
(45) Date of Patent: Feb. 13, 2018

(54) METHOD FOR MANUFACTURING A MONOBLOCK-TYPE ALUMINUM CALIPER HOUSING

(71) Applicant: J&C CO., LTD., Busan (KR)

(72) Inventor: Cheol Kyu Jung, Busan (KR)

(73) Assignee: J&C CO., LTD., Busan (KR)

(*) Notice: Subject to any disclaimer, the term of this patent is extended or adjusted under 35 U.S.C. 154(b) by 0 days.

(21) Appl. No.: 15/422,608

(22) Filed: Feb. 2, 2017

(30) Foreign Application Priority Data

Nov. 21, 2016 (KR) ........................ 10-2016-0154724

(51) Int. Cl.
| | |
|---|---|
| *B22C 9/24* | (2006.01) |
| *F16D 65/00* | (2006.01) |
| *B22C 9/10* | (2006.01) |
| *B22C 9/02* | (2006.01) |
| *B22D 21/00* | (2006.01) |
| *B22D 25/02* | (2006.01) |
| *B22D 30/00* | (2006.01) |
| *B22D 29/00* | (2006.01) |

(52) U.S. Cl.
CPC ............ *F16D 65/0068* (2013.01); *B22C 9/02* (2013.01); *B22C 9/108* (2013.01); *B22C 9/24* (2013.01); *B22D 21/007* (2013.01); *B22D 25/02* (2013.01); *B22D 29/005* (2013.01); *B22D 30/00* (2013.01); *F16D 2200/003* (2013.01); *F16D 2250/0007* (2013.01)

(58) Field of Classification Search
CPC .. B22C 9/02; B22C 9/108; B22C 9/24; B22D 21/007; B22D 25/02; B22D 29/005; B22D 30/00
See application file for complete search history.

(56) References Cited

FOREIGN PATENT DOCUMENTS

| | | |
|---|---|---|
| JP | 8-24991 | 1/1996 |
| JP | 2000-97262 | 4/2000 |
| KR | 10-1021952 | 3/2011 |
| KR | 10-1241229 | 3/2013 |
| KR | 10-2013-0114445 | 10/2013 |

*Primary Examiner* — Kevin P Kerns
*Assistant Examiner* — Steven Ha
(74) *Attorney, Agent, or Firm* — Kile Park Reed & Houtteman PLLC

(57) ABSTRACT

A method for manufacturing a monoblock-type caliper housing includes: preparing a middle core mold provided with a first and second core-forming portion and a first, second, and third channel; pouring molding sand into the first and second core-forming portions and the first, second, and third channels; heating the middle core mold to form a middle core; forming a salt coating layer on the surfaces of the first, second, and third channel-forming portions of the middle core; putting and heating the middle core in the middle core mold; putting the resultant middle core in a casting mold; pouring molten aluminum in a cavity between the middle core and the casting mold to form a caliper housing; applying ultrasonic waves to the caliper housing to remove the middle core; rinsing the caliper housing; and forming an oil supply hole in the caliper housing.

1 Claim, 4 Drawing Sheets

METHOD FOR MANUFACTURING A MONOBLOCK-TYPE ALUMINUM CALIPER HOUSING

BACKGROUND OF THE INVENTION

1. Field of the Invention

The present invention relates to a method for manufacturing a caliper housing for a vehicle disk brake. More particularly, the present invention relates to a method for manufacturing a monoblock-type aluminum caliper housing for a disk brake, by which a lightweight caliper housing can be manufactured and manufacturing productivity can be dramatically increased in processes subsequent to a casting process.

2. Description of the Related Art

A caliper for a disk brake is a hydraulic system used to retard the rotation of vehicle wheels by squeezing pairs of brake pads against a disk in a disk brake-type vehicle. Recently, opposing-type calipers, in which a plurality of cylinders is provided in each side of a disk brake caliper and brake pads are actuated by hydraulic pressure applied by a master cylinder when breaking force is applied to a brake pedal, have been widely used.

As illustrated in FIG. 6, a conventional disk brake caliper typically includes: a first caliper housing and a second caliper housing that have respective openings facing each other and have respective cylinders in the first and second caliper housings; pistons installed in the cylinders and actuated by hydraulic pressure; hoses serving as oil channels through which hydraulic pressure is transferred to each piston; and frictional pads that are installed at respective sides of a brake disk and move in response to operation of the pistons to generate frictional force.

As illustrated in FIG. 6, the caliper housing of a conventional disk brake is composed of two parts that are joined by bolts. This type of caliper housing is problematic in that a manufacturing method thereof is complex and the joined portions are loosened with operation time. Moreover, since oil is supplied to one part of the caliper housing via a hose that is exposed, there is a risk that the brake of a vehicle cannot work when the hose is damaged.

In order to solve this problem, monoblock-type caliper housings have been proposed. Monoblock-type caliper housings are usually manufactured through a casting method. Casting of a caliper housing includes the steps of putting a middle core in a casting mold that has a space to accommodate the middle core therein and pouring molten metal into a cavity between the middle core and the casting mold.

Middle cores used for producing caliper housings are made of molding sand that is a mixture of silica and binder. To produce a middle core, molding sand is first charged into a mold cavity formed in a middle core mold, the middle core mold is heated for a predetermined period of time to form the middle core, and the middle core is de-molded. As a consequence, the heated molding sand becomes a middle core as illustrated in FIG. 7. The middle core has core portions 21 and 22 and channel-forming portions 31 and 32 one of which connects the core portion 21 and the core portion 22 to each other and the other of which connects respective sides of one of the core portions 21 and 22 to each other.

In the middle core, the core portions 21 and 22 are portions that respectively form cylinders in the opposite sides of a caliper housing. The channel-forming portions 31 and 32 are portions to form oil channels, of the caliper housing, through which oil flows to actuate pistons installed in the cylinders. One of the oil channels connects the two cylinders arranged in the left and right sides of the caliper housing and the other one of the oil channels connects respective sides of one of the two cylinders to each other.

A caliper housing manufacturing method using a channel-provided monoblock-type middle core is preferred to a caliper housing manufacturing method in which a housing without oil channels is first produced using a casting mold rather than a middle core and then the channel-less housing undergoes an additional machining process to form oil channels in the housing, because the former method is simpler.

Meanwhile, in the method using a middle core, the middle core that is used to manufacture a caliper housing undergoes ultrasonic vibration cleaning after the casting process is performed, so that the middle core is finally removed. However, since the channel-forming portions of the middle core, which are portions to form oil channels in a caliper housing, are disposed deep inside a caliper housing after a casting process is finished, it is difficult to perfectly remove the channel-forming portions of the middle core during the cleaning process.

When residues of the middle core made of molding sand accidently remain in any oil channel of a caliper housing, the residues are likely to be mixed with oil resulting in brake malfunctioning and leading to accidents. For this reason, vehicle makers are trying to prevent this problem by performing ultrasonic vibration cleaning multiple times, which is a factor of lowering manufacturing productivity of caliper housings.

The foregoing is intended merely to aid in the understanding of the background of the present invention, and is not intended to mean that the present invention falls within the purview of the related art that is already known to those skilled in the art.

DOCUMENT OF RELATED ART

Patent Document (Patent Document 1) Korean Patent Application Publication No. 2013-0114445
(Patent Document 2) Korean Patent No. 1021952
(Patent Document 3) Korean Patent No. 1241229
(Patent Document 4) Japanese Patent Application Publication No. H8-24991
(Patent Document 5) Japanese Patent Application Publication No. 2000-97262

SUMMARY OF THE INVENTION

Accordingly, the present invention has been made keeping in mind the above problems occurring in the related art, and the present invention is intended to propose a method for manufacturing a monoblock-type aluminum caliper housing, by which a lightweight caliper housing can be manufactured and manufacturing productivity of caliper housings can be dramatically improved.

In order to achieve the above object, according to one aspect of the present invention, there is provided a method for manufacturing a monoblock-type aluminum caliper housing, the method including: preparing a middle core mold provided with a first core-forming portion and a second core-forming portion that are at a predetermined distance from each other, with a first channel and a second channel connecting the first and second core-forming portions to each other, and with a third channel connecting respective sides of the first core-forming portion to each other; sealing the middle core mold and pouring molding sand into the first and second core-forming portions and the first, second, and third channels; performing primary molding by heating the middle core mold; opening the middle core mold and de-molding a middle core having a first core portion, a second core portion, a first channel-forming portion, a second channel-forming portion, and a third channel-forming portion from the middle core mold; forming a salt coating layer with a predetermined thickness on the surfaces of the first, second, and third channel-forming portions of the middle core, putting the middle core coated with the salt coating layer in the middle core mold again, sealing the middle core mold, and performing secondary molding by heating the middle core mold; opening the middle core mold and de-molding the middle core unified with the salt coating layer; preparing a casting mold having an internal mold surface having a predetermined shape; positioning the middle core in the casting mold such that the internal mold surface of the casting mold is spaced from an external surface of the middle core 20 by a predetermined distance; pouring molten aluminum into a cavity between the internal mold surface of the casting mold and the external surface of the middle core in a state in which the casting mold is sealed; cooling down the casting mold that contains the molten aluminum therein; de-molding a monoblock-type caliper housing made of aluminum in which the middle core is contained, from the casting mold; removing the middle core from the monoblock-type caliper housing by applying ultrasonic waves to the monoblock-type caliper housing; spraying high-pressure washing water into a first oil channel that connects a first cylinder and a second cylinder formed in the monoblock-type caliper housing to each other, a second oil channel that connects a third cylinder and a fourth cylinder formed in the monoblock-type caliper housing to each other, and a third oil channel that connects the second and fourth cylinders formed in the monoblock-type caliper housing to each other, to remove salt residues remaining in the first, second, and third oil channels; and forming an oil supply hole in a center portion of either one side of the monoblock-type caliper housing such that the oil supply hole is connected to the first oil channel or the second oil channel.

According to the present invention, since aluminum is used as a material for a caliper housing, a lightweight caliper housing can be manufactured. In addition, since a salt coating layer is formed on the surface of a channel-forming portion of a middle core, the middle core can be perfectly removed through a cleaning process, which dramatically improves manufacturing productivity of caliper housings. Furthermore, malfunctioning of a disk brake attributable to residues of molding sand can be prevented.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described below with reference to the accompanying drawings. In the following description, descriptions of known functions and configurations which have been deemed to unnecessarily obscure the gist of the present invention will be omitted below.

A method for manufacturing a monoblock-type aluminum caliper housing according to one embodiment of the present invention includes preparation of a middle core mold 10, pouring of molding sand, primary molding and de-molding, salt coating, secondary molding and de-molding, preparation of a casting mold, pouring of molten aluminum, cooling of the molten aluminum, de-molding of a monoblock-type caliper housing 40 from the casting mold, removal of a middle core 20, cleaning, and formation of an oil supply hole. Each of these processes will be described in detail below.

Figure 1:
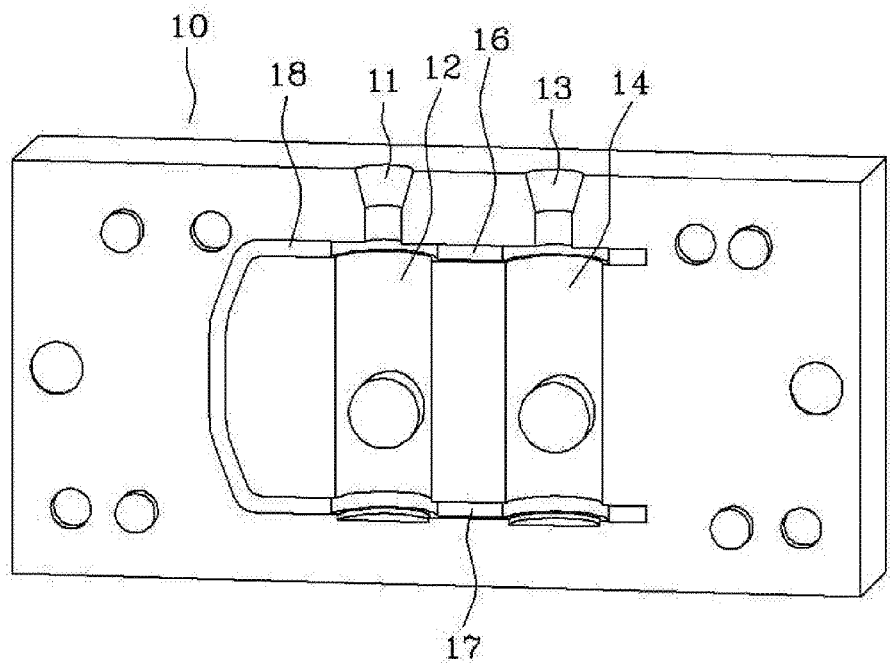
FIG. 1 is a schematic view illustrating a middle core mold used to manufacture a middle core that is used in a casting process, according to one embodiment of the present invention.

First, a middle core mold 10 is prepared. The middle core mold 10 may be a typical mold that is widely used to manufacture a middle core in the related art, as illustrated in FIG. 1. The middle core mold 10 has a first core-forming portion 12, a second core-forming portion 14, a first channel portion 16, a second channel portion 17, and a third channel portion 18.

The first core-forming portion 12 and the second core-forming portion 14 are at a predetermined distance from each other and have a predetermined depth in the middle core mold 10. The first and second channel portions 16 and 17 connect the first core-forming portion 12 and the second core-forming portion 14 to each other. The third channel portion 18 connects respective sides of the first core-forming portion 12 to each other. Reference signs 11 and 13 denote molding sand inlets.

Next, the prepared middle core mold 10 is sealed. The sealing of the middle core mold 10 is performed by joining the middle core mold 10 serving as a lower plate to an upper plate that has a structure corresponding to that of the lower plate illustrated in FIG. 1.

After the middle core mold 10 is sealed, molding sand is poured into the sealed middle core mold 10 through the molding sand inlets 11 and 13. The molding sand may be any conventional composition used to manufacture a middle core in the related art, for example, a composition in which silica and a binder are mixed. After the molding sand is poured through the molding sand inlets 11 and 13, all of the cavities including the first and second core-forming portions 12 and 14 and the first, second, and channel portions 16, 17, and 18 of the middle core mold 10 are filled with the molding sand.

After all of the cavities of the middle core mold 10 are filled with the molding sand, the middle core mold 10 is heated for a predetermined period of time (this process is called primary molding). According to the present invention, the primary molding is a process to produce a middle core by using the middle core mold 10. The heating time period and heating temperature for the primary molding are determined in accordance with characteristics of the molding sand.

Figure 2:
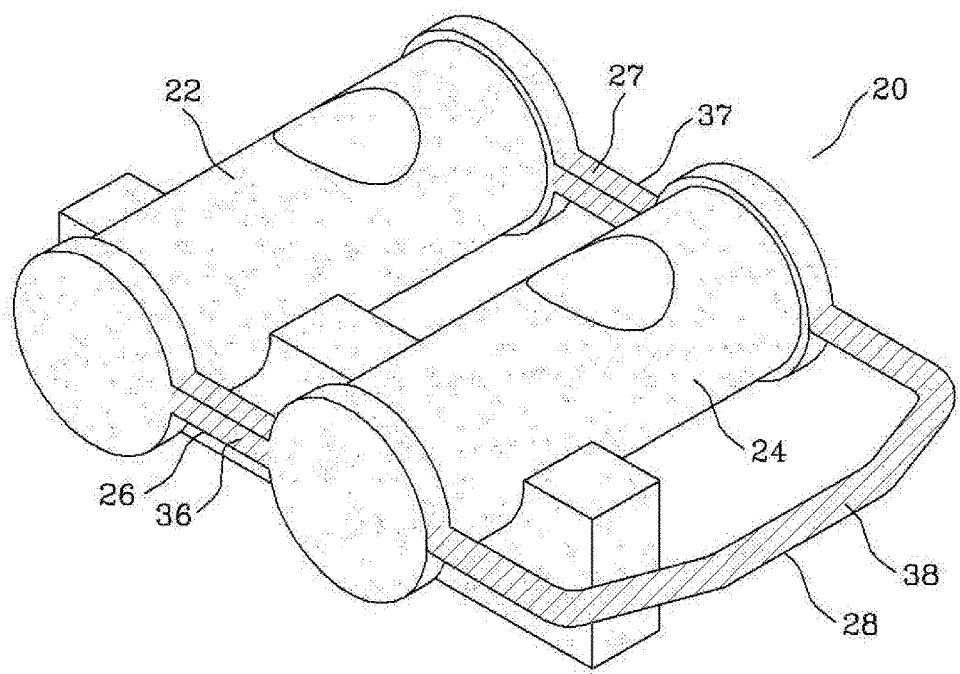
FIG. 2 is a schematic perspective view illustrating a step of coating a middle core, produced through a primary molding process, with salt to form a salt coating layer, according to one embodiment of the present invention.

When the predetermined time period elapses and thus the molding sand is cured, the middle core mold 10 is divided and then removed to produce a middle core 20. FIG. 2 schematically illustrates the middle core 20 produced through the primary molding. The middle core 20 has a first core portion 22, a second core portion 24, a first channel-forming portion 26, a second channel-forming portion 27, and a third channel-forming portion 28 all of which are integrated as a single body. Those portions of the middle core 20 correspond to the respective portions of the middle core mold 10 of FIG. 1.

Figure 5:
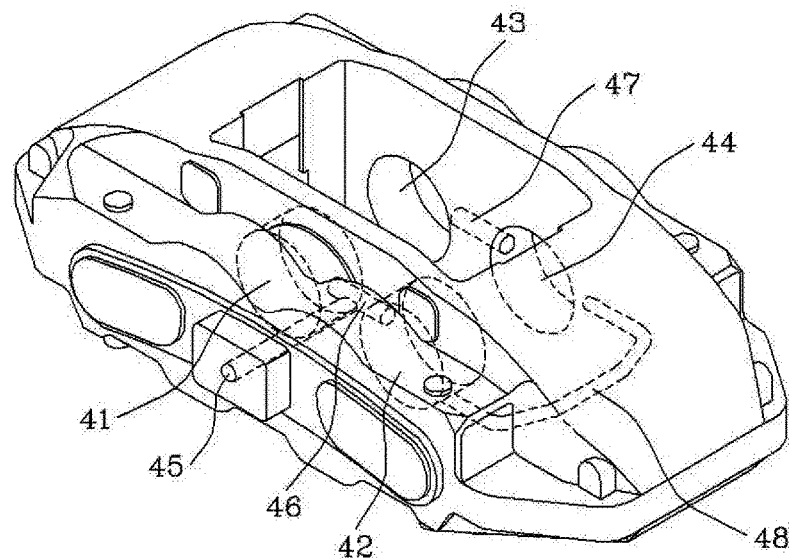
FIG. 5 is a perspective view illustrating a monoblock-type aluminum caliper housing that is produced through the method for manufacturing a monoblock-type aluminum caliper housing according to one embodiment of the present invention.
Figure 6:
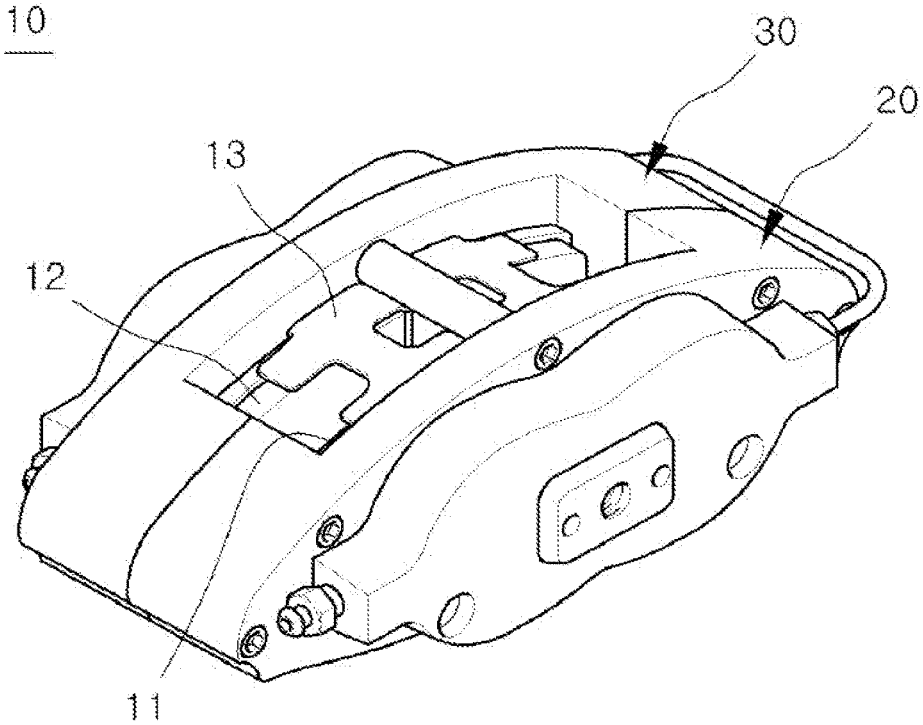
FIG. 6 is a perspective view illustrating a conventional caliper housing for a disk brake.

The first and second portions 22 and 24 of the middle core 20 are portions to form cylinders 41, 42, 43, and 44 that are symmetrically arranged in left and right sides of a caliper housing 40 described below. As illustrated in FIG. 5, the first and second channel-forming portions 26 and 27 are connectors that connect the first and second cylinders 41 and 42 formed in the caliper housing 40 to the third and fourth cylinders 43 and 44 formed in the caliper housing 40. The third channel-forming portion 28 is a connector that connects the second cylinder 42 and the fourth cylinder 44 of the caliper housing 40 to each other. The first, second, and third channel-forming portions 26, 27, and 28 are portions to form oil channels in the caliper housing so that oil, used to operate pistons (not illustrated), can flow through the oil channels in the caliper housing 40.

After the middle core 20 is produced through the primary molding, salt is applied to the surfaces of the first, second, and third channel-forming portions 26, 27, and 28 of the middle core 20 to a predetermined thickness, as illustrated in FIG. 2, so that salt coating layers 36, 37, and 38 are formed on the surfaces of the first, second, and third channel-forming portions 26, 28, and 28 of the middle mold 20. The salt coating layers 36, 37 and 38 may come in contact with the internal surfaces of oil channels of the caliper housing while the caliper housing is being casted.

Salt coating is performed by applying powdered fine salt particles on the surfaces of the first, second, and third channel-forming portions 26, 27, and 28 of the middle core 20 or dipping the first, second, and third channel-forming portions 26, 27, and 28 of the middle core 20 in a high concentration salt solution for a predetermined period of time. The thickness of each of the salt coating layers 36, 37, and 38 is preferably determined such that the first, second, and third channel-forming portions 26, 27, and 28 coated with the salt coating layers 36, 37, and 38 can be received in the corresponding cavities of the middle core mold 10 in the following process.

After the salt coating on the surfaces of the first, second, third channel-forming portions 26, 27 and 28 of the middle core 20 is finished, the middle core 20 is put in the middle core mold 10 again, and then middle core mold 10 is sealed. After that, the middle core mold 10 is heated again (this process is called secondary molding). Since the middle core 20 received in the middle core mold 10 has already undergone the primary molding, this process is preferably performed at temperatures that are set such that the salt coating layers are completely unified with the middle core 20. Specifically, the heating temperature range and time for the secondary molding are determined according to the thicknesses of the salt coating layers.

Figure 3:
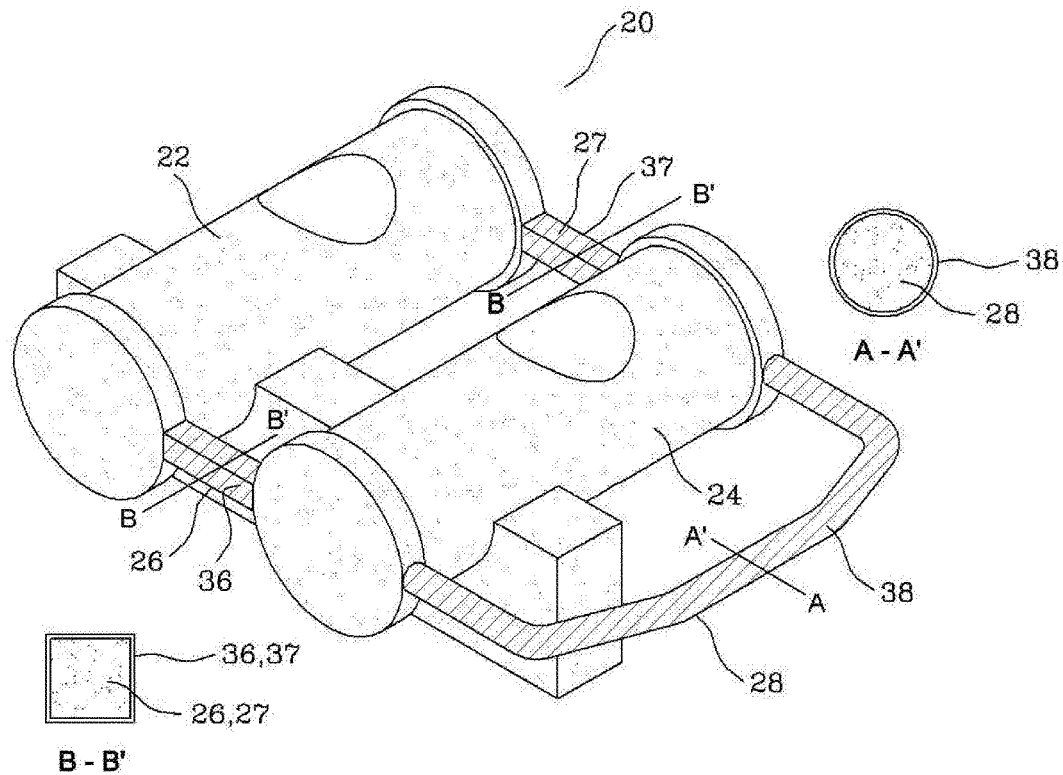
FIG. 3 is a perspective view illustrating an overall construction of a middle core obtained after a secondary molding process, according to one embodiment of the present invention.
Figure 7:
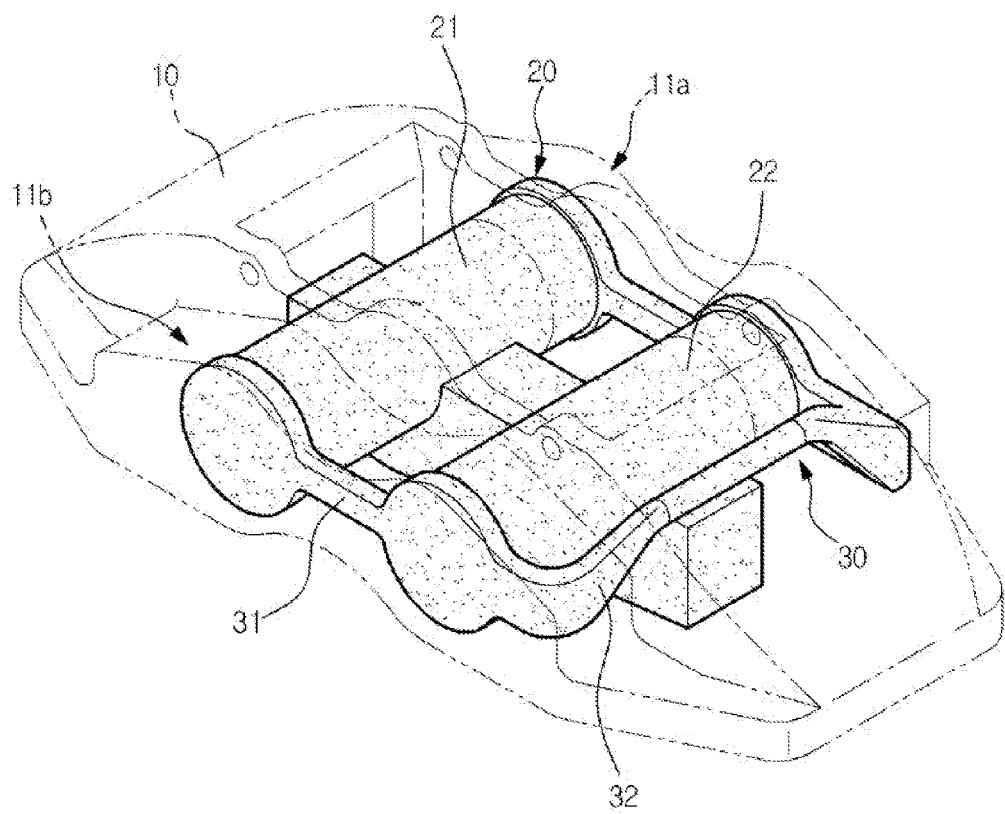
FIG. 7 is a perspective view illustrating a conventional middle core.

After the secondary molding is performed, the middle core mold 10 is opened and the middle core 20 is de-molded from the middle core mold 10. The overall construction of the middle core 20 that has undergone the secondary molding is illustrated in FIG. 3. The middle core 20 that is manufactured through the method of the present invention has almost the same shape as a conventional middle core shown in FIG. 7 but is different in that it has the salt coating layers 36, 37, and 38 having a predetermined thickness, on the surfaces of the first, second, and third channel-forming portions 26, 27, and 28. That is, the middle core 20 in which molding sand and salt are unified is produced through the secondary molding.

Next, a casting mold (not shown) is prepared. The contour of an internal mold surface of the casting mold corresponds to an external shape of a caliper housing that is a final product to be obtained through the manufacturing method of the present invention. This casting mold may be a conventional casting mold that is generally used for casting conventional caliper housings.

After the casting mold is prepared, the middle core 20 is positioned in the casting mold such that there is a mold cavity between the internal mold surface of the casting mold 20 and the external surface of the middle core 20, and then the casting mold is sealed.

After the casting mold in which the middle core 20 is accommodated is sealed, molten aluminum is poured into the mold cavity between the internal mold surface of the casting mold and the external surface of the middle core 20. The reason of the use of molten aluminum instead of cast iron is to reduce the weight of a caliper housing.

Figure 4:
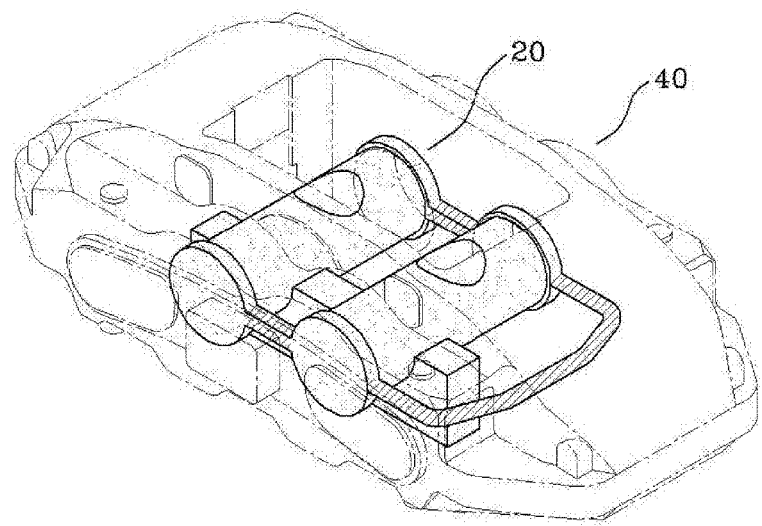
FIG. 4 is a perspective view illustrating a caliper housing and a middle core, manufactured using a casting mould, according to one embodiment of the present invention.

After the molten aluminum is poured into the casting mold, the casting mold is cooled down for a predetermined period of time, and then the caliper housing 40 is de-molded from the casting mold. The caliper housing 40 de-molded from the casting mold has a monoblock-type structure and still contains the middle core 20 therein, as illustrated in FIG. 4.

After the aluminum-based caliper housing 40 that contains the middle core 20 therein is de-molded from the casting mold, ultrasonic waves are applied to the caliper housing 40 so that the middle core 20 can be removed. Due to ultrasonic vibrations, the middle core 20 that is in contact with the internal surface of the caliper housing 40 is removed.

At this point, the first, second, and third channel-forming portions 26, 27, and 28 of the middle core 20 contained in the caliper housing 40 can be easily removed by ultrasonic vibrations because the external surface of the molding sand of the middle core 20 is not in direct contact with the internal surfaces of the oil channels of the caliper housing 30 due to the existence of the salt coating layers 36, 37, and 38 therebetween. Only a small amount of salt of the salt coating layers remains on the internal surfaces of the oil channels of the caliper housing 40 after the ultrasonic vibration cleaning.

After the ultrasonic vibration cleaning is performed, the caliper housing 40 is rinsed with high-pressure washing water. The high-pressure washing water is sprayed into the first oil channel 46 that connects the first and second cylinders 41 and 42 of the caliper housing 40 to each other, the second oil channel 47 that connects the third and fourth cylinders 43 and 44 of the caliper housing 40 to each other, and the third oil channel 48 that connects the second and fourth cylinders 42 and 44 of the caliper housing 40 to each other, so that salt residues in the first, second, and third oil channels 46, 47, and 48 can be completely removed.

After the middle core 20 and the salt residues are completely removed from the caliper housing 40, an oil supply hole is bored in a center portion of either one side of the caliper housing 40 such that the oil supply hole can connected to any one of the first oil channel 46 or the second oil channel 47. FIG. 5 illustrates an example in which the oil supply hole 45 is connected to the first oil channel 46.

When a predetermined amount of oil is supplied through the oil supply hole 45, a portion of the supplied oil is distributed to the first and second cylinders 41 and 42 via the first oil channel 46, and the rest of the supplied oil is distributed to the third and fourth cylinders 43 and 44 via the second oil channel 47. That is, oil used to actuate the pistons (not illustrated) flows through the oil channels in the caliper housing 40.

Next, the caliper housing 40 undergoes conventional post processes such as testing and inspection for shorting. Next, necessary components such as pistons are assembled with the caliper housing to produce a disk brake for use in a vehicle.

As described above, according to the present invention, since the caliper housing is made of aluminum, the caliper housing is lightweight. In addition, since the surfaces of the channel-forming portions of the middle core are coated with the salt coating layers during the production of the monoblock-type caliper housing, in which the middle core is used, the channel-forming portions of the middle core can be easily removed in the following cleaning process. Therefore, manufacturing productivity of caliper housings can be dramatically improved. Furthermore, since the residues of molding sand can be perfectly removed through the following rinsing process, malfunctioning of a disk brake attributable to the residues of molding sand can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a monoblock-type aluminum caliper housing, the method comprising:
    preparing a middle core mold provided with a first core-forming portion and a second core-forming portion that are at a predetermined distance from each other, with a first channel and a second channel that connect the first and second core-forming portions to each other, and with a third channel that connects respective sides of the first core-forming portion to each other;
    sealing the middle core mold and pouring molding sand into the first and second core-forming portions and the first, second, and third channels;
    performing primary molding by heating the middle core mold;
    opening the middle core mold and de-molding a middle core having a first core portion, a second core portion, a first channel-forming portion, a second channel-forming portion, and a third channel-forming portion from the middle core mold;
    forming a salt coating layer with a predetermined thickness on the surfaces of the first, second, and third channel-forming portions of the middle core, putting the middle core coated with the salt coating layer in the middle core mold again, sealing the middle core mold, and performing secondary molding by heating the middle core mold;
    opening the middle core mold and de-molding the middle core unified with the salt coating layer;
    preparing a casting mold having an internal mold surface having a predetermined shape;
    positioning the middle core in the casting mold such that the internal mold surface of the casting mold is spaced from an external surface of the middle core by a predetermined distance;
    pouring molten aluminum into a cavity between the internal mold surface of the casting mold and the external surface of the middle core in a state in which the casting mold is sealed;
    cooling down the casting mold that contains the molten aluminum therein;
    de-molding a monoblock-type caliper housing made of aluminum in which the middle core is contained, from the casting mold;
    removing the middle core from the monoblock-type caliper housing by applying ultrasonic waves to the monoblock-type caliper housing;
    spraying high-pressure washing water into a first oil channel that connects a first cylinder and a second cylinder formed in the monoblock-type caliper housing to each other, a second oil channel that connects a third cylinder and a fourth cylinder formed in the monoblock-type caliper housing to each other, and a third oil channel that connects the second and fourth cylinders formed in the monoblock-type caliper housing to each other, to remove salt residues remaining in the first, second, and third oil channels; and
    forming an oil supply hole in a center portion of either one side of the monoblock-type caliper housing such that the oil supply hole is connected to the first oil channel or the second oil channel.

* * * * *